United States Patent
Carpenter et al.

(10) Patent No.: US 12,269,760 B1
(45) Date of Patent: Apr. 8, 2025

(54) INJECTABLE OXIDANT MATERIALS FOR ENVIRONMENTAL REMEDIATION

(71) Applicant: Triad Growith Partners, LLC, Greensboro, NC (US)

(72) Inventors: Alexis Wells Carpenter, Chapel Hill, NC (US); Danilo Joel Meyer-Arrivillaga, Durham, NC (US); Julia Whitney Darcy, Durham, NC (US); Wesley Langdon Storm, Durham, NC (US)

(73) Assignee: Triad Growth Partners, LLC, Greensboro, NC (US)

( * ) Notice: Subject to any disclaimer, the term of this patent is extended or adjusted under 35 U.S.C. 154(b) by 110 days.

(21) Appl. No.: 17/713,363

(22) Filed: Apr. 5, 2022

Related U.S. Application Data (60) Provisional application No. 63/170,729, filed on Apr. 5, 2021.

(51) Int. Cl.
| | |
|---|---|
| *C02F 1/68* | (2023.01) |
| *B01J 20/26* | (2006.01) |
| *C02F 1/72* | (2023.01) |
| *C08F 218/08* | (2006.01) |
| *C02F 1/00* | (2023.01) |
| *C02F 101/30* | (2006.01) |
| *C02F 103/06* | (2006.01) |

(52) U.S. Cl.
CPC ............ *C02F 1/688* (2013.01); *B01J 20/267* (2013.01); *C02F 1/722* (2013.01); *C08F 218/08* (2013.01); *C02F 1/00* (2013.01); *C02F 2101/30* (2013.01); *C02F 2103/06* (2013.01)

(58) Field of Classification Search
None
See application file for complete search history.

(56) References Cited

U.S. PATENT DOCUMENTS

| | | | |
|---|---|---|---|
| 2008/0199256 A1* | 8/2008 | McPhillips | C09K 3/32 405/129.57 |
| 2019/0151913 A1* | 5/2019 | Swearingen | C09K 8/536 |

OTHER PUBLICATIONS

Doan, Yen Thi. (Potassium Permanganate Embedded in Pellets of Polyvinyl Acetate (PVAc) or Polyethylene Oxide (PEO) for In-Situ Controlled Release of Chemical Oxidants in Water. Master's Thesis, North Carolina A&T State University, Greensboro, NC, 2018). (Year: 2018).*
Spectrum: Polyvinyl acetate SDS: pp. 1-8, 2019, accessed on Mar. 13, 2024 at https://www.spectrumchemical.com/media/sds/P1800_AGHS.pdf). (Year: 2019).*
Lee et al. (Chemosphere, 2007, 66, 2058-2066). (Year: 2007).*
Liang et al. (Water Research, 2014, 54, 149-158). (Year: 2014).*
Ross et al. (Journal of Environmental Engineering, 2005, 131, 1203-1211). (Year: 2005).*
Schnarr et al. (Journal of Contaminant Hydrology, 1998, 29, 205-224). (Year: 1998).*

* cited by examiner

*Primary Examiner* — Clare M Perrin
(74) *Attorney, Agent, or Firm* — Fox Rothschild LLP (57) ABSTRACT

Certain exemplary embodiments can provide a composition of matter adapted for and/or resulting from, a method that can comprise and/or relate to, activities comprising treating contaminated groundwater via mixing a polymer with a cross-linking agent and/or an oxidant and delivering the mixture to contaminated groundwater to form an in situ controlled-release composition.

16 Claims, 7 Drawing Sheets

INJECTABLE OXIDANT MATERIALS FOR ENVIRONMENTAL REMEDIATION

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Certain exemplary embodiments relate to compositions of matter that can be used in methods for causing the controlled release of oxidants in environmental remediation applications. Certain exemplary embodiments relate to a composite material comprising at least one agent that can spontaneously promote cross-linking of a polymer in the presence of water and at least one oxidant. In some embodiments, the cross-linking agent can be an oxidant. In some embodiments, multiple oxidants can be used. The material formed by mixing the polymer, oxidant, and/or cross-linking agent in the presence of water can be a viscous gel, a syrup, a clay-like material, and/or a malleable putty-like material, etc., that can exhibit sustained release of the oxidant into groundwater and/or the ground. The material can be deployed via hydraulic injection and/or by placement within a well, borehole, and/or excavated soil site.

Via certain exemplary embodiments, a controlled release oxidant (such as in the form of a gel and/or gelatinous material, a syrup, a clay-like material, a putty-like material, etc.) can be formed from mixing a cross-linking agent with a polymer capable of cross-linking in the presence of said cross-linking agent and an oxidant. In some embodiments, the cross-linking agent can be an oxidant.

Example 1: Synthesis of Controlled Release Oxidant Gel from Potassium Permanganate and Polyvinyl Acetate According to an exemplary embodiment, potassium permanganate was mixed with a polymer capable of undergoing cross-linking in the presence of permanganate. One polymer capable of undergoing cross-linking in the presence of permanganate is polyvinyl acetate ("PVAc", such as UWIFS PVAc from Wacker Chemie AG of Munich, Germany, or B60FG UWIFS PVAc of Wacker Chemie AG of Munich Germany). Not intending to be bound by any particular theory, the acetate groups present in the polymer seem to exhibit hydrogen bonding with tetravalent oxides such as permanganate, inducing a cross-linking effect that was observed when the acetate-containing PVAc polymers were combined with the tetravalent oxide permanganate species. In one embodiment, approximately 0.5 grams of potassium permanganate was combined with approximately 0.5 grams of UWIFS PVAc. The mixture of oxidant and polymer was blended by inverting in a sealed container for approximately 10 inversions and to this dispersion was added approximately 0.5 milliliters of deionized water. After addition of water, the material in the container formed a viscous gel within approximately 48 to approximately 120 hours.

Figure 1:
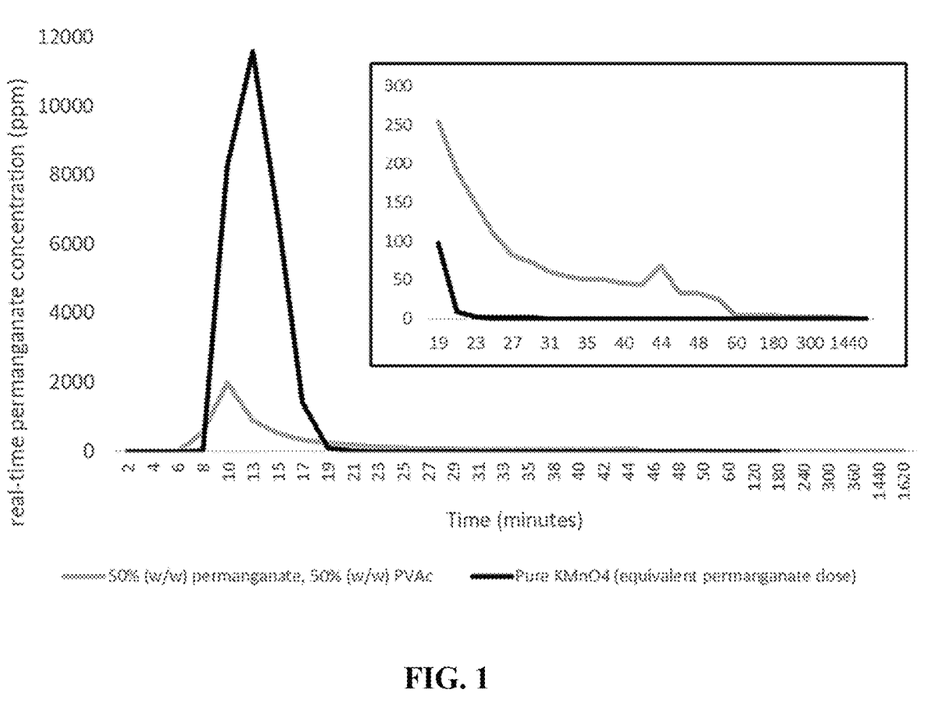
FIG. 1 is a graph of a release of an exemplary oxidant.

In one exemplary embodiment, the resulting gel material, comprising approximately 50% (w/w) potassium permanganate, was sampled at approximately 72 hours after addition of deionized water for permanganate release characterization. To measure permanganate release, approximately 1 gram of the apparently cross-linked viscous gel material was placed on a sand-packed wet column (total volume approximately 250 mL). A deionized water mobile phase was fed through the column at a flow rate of approximately 0.08 milliliters per second. At variable time intervals of up to 1,620 minutes, approximately 200 microliter aliquot samples from column eluent were removed and measured spectrophotometrically at approximately 525 nm using a Hach DR1900 portable spectrophotometer. Permanganate concentrations in the eluent are shown as a function of time in FIG. 1, which demonstrates slower release of permanganate ion by the gel-like material compared to powdered potassium permanganate. In this configuration, after approximately 23 minutes, the release of permanganate ion from the columns loaded with powdered potassium permanganate had dropped to non-detectable levels, while columns loaded with the cross-linked gel materials released measurable levels of permanganate ion for 60 minutes, indicating an approximately 2.6-fold increase in release duration for the gel-like materials. FIG. 1 further shows a release of permanganate ion from cross-linked gel-like oxidant materials (grey line) compared to powdered potassium permanganate (black line). The in-lay shows a zoomed-in version of the graph at later times.

Figure 2:
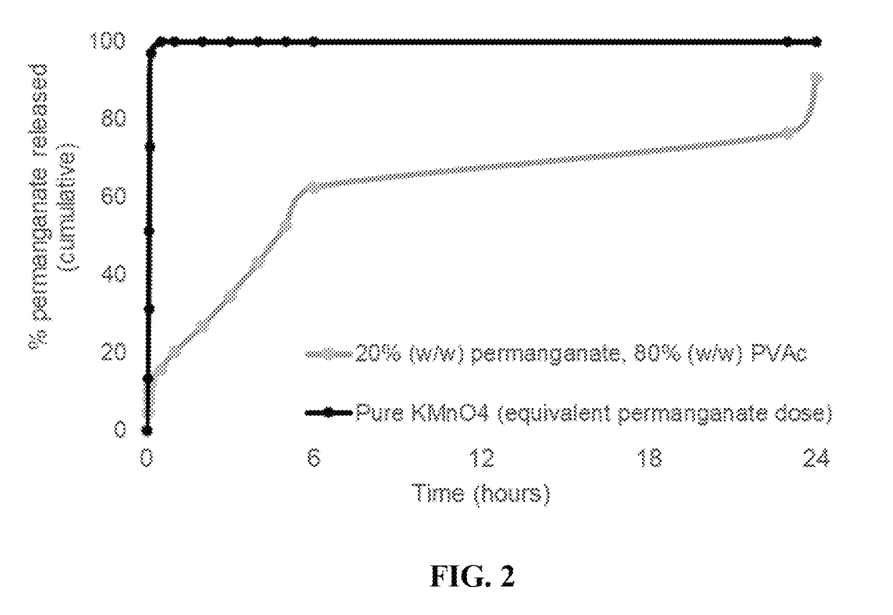
FIG. 2 is a graph of a release of an exemplary oxidant.

In other exemplary embodiments, the weight percentage of potassium permanganate can be less than 50%, such as approximately 20%. In one such example, approximately 0.2 grams of potassium permanganate was combined with approximately 0.8 grams of UWIFS PVAc. The mixture of oxidant and polymer was blended by inverting in a sealed container for approximately 10 inversions and to this dispersion was added approximately 0.5 milliliters of deionized water. After addition of water, the material in the container formed a viscous gel within approximately 72 hours. The resulting gel material comprising approximately 20% (w/w) potassium permanganate was sampled approximately 72 hours after addition of deionized water and subjected to a permanganate release assay. To measure permanganate release, approximately 1 gram of the apparently cross-linked viscous gel material was placed on a sand-packed wet column (total volume approximately 250 mL). A deionized water mobile phase was fed through the column at a flow rate of approximately 0.08 milliliters per second. At time intervals of up to approximately 24 hours, approximately 200 microliter aliquot samples from column eluent were removed and measured spectrophotometrically at approximately 525 nm using a Hach DR1900 portable spectrophotometer. Permanganate concentrations in the eluent were reported as a cumulative percentage of the total permanganate in the initial starting material. A similar column procedure was used to measure permanganate elution from a dose-matched powdered permanganate control. The results, shown in FIG. 2, demonstrate full elution of powdered potassium permanganate within approximately 0.15 hours. In contrast, permanganate release from the gel-like material released to at least approximately 24 hours, and at approximately 6 hours had released only approximately 60% of the total dose. Stated differently, FIG. 2 shows cumulative release of permanganate ion from cross-linked gel-like oxidant materials comprised of approximately 20% (w/w) potassium permanganate and approximately 80% (w/w) PVAc (grey line) compared to powdered potassium permanganate (black line).

Figure 3:
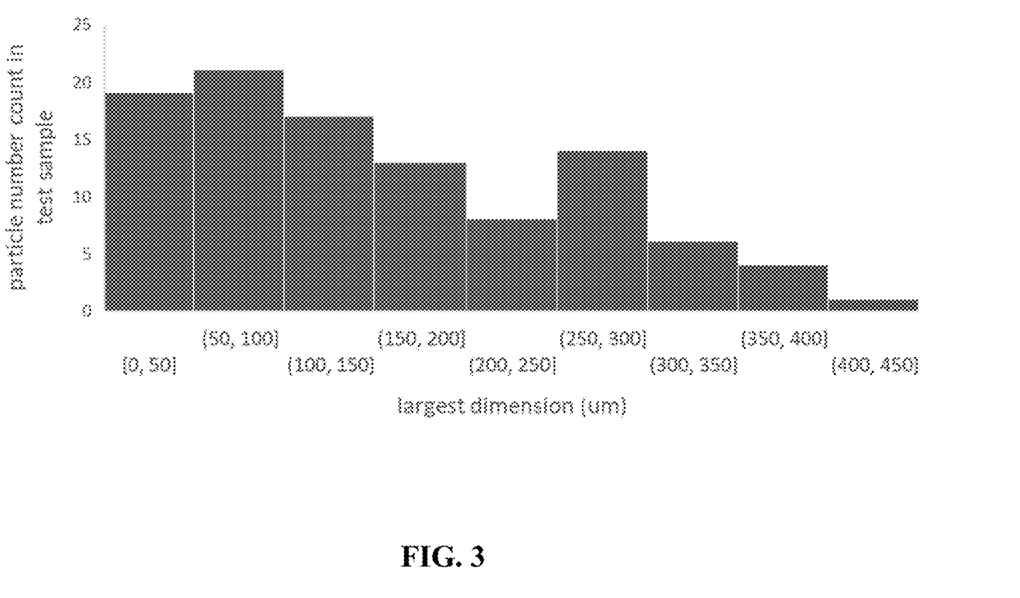
FIG. 3 is a graph of an exemplary particle size distribution.
Figure 4:
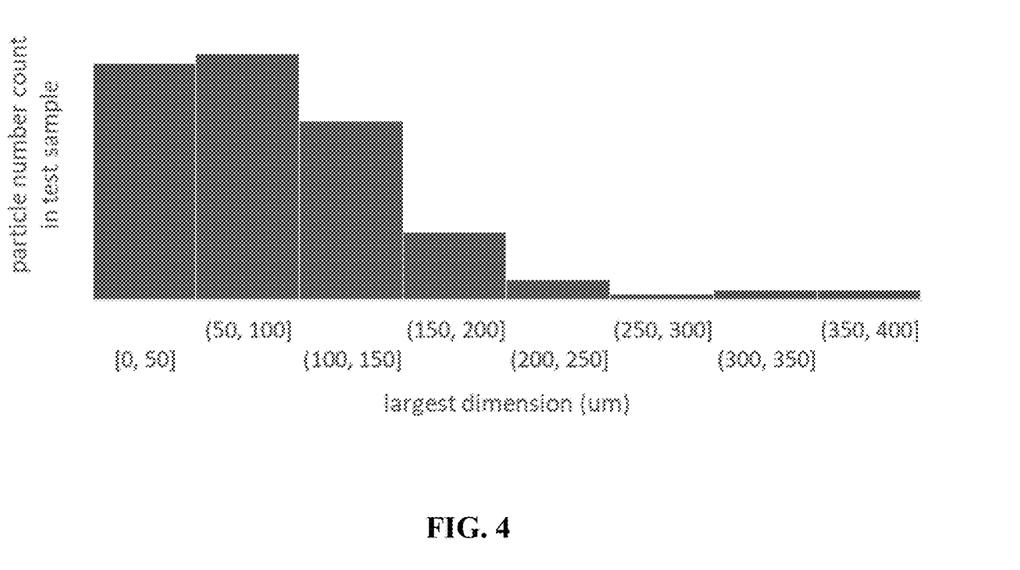
FIG. 4 is a graph of an exemplary particle size distribution.

Exemplary polymers and/or polymer blends that can form viscous gels when combined with water can comprise PVAc milled to a size distribution of about 5 microns to about 2000 microns, and any sub-distribution within that range, for instance, about 5- about 100 microns, about 5- about 250 microns, about 5-500 microns, about 5- about 1000 microns, about 10- about 100 microns, about 10- about 250 microns, about 10- about 500 microns, about 100- about 1000 microns, about 100- about 250 microns, about 100- about 500 microns, about 10- about 1000 microns, about 100- about 1000 microns, about 500-about 1000, about 10- about 2000 microns, and/or about 100- about 2000 microns, etc. The size distributions of PVAc within some exemplary embodiments of controlled-release gels are shown in FIGS. 3 and 4, which show particle size distribution of a polymer formulation A and a polymer formulation B, respectively.

The molecular weight of PVAc oligomers within the milled PVAc material can be between approximately 35,000 and approximately 540,000 Daltons, and all subranges therebetween, such as between approximately 35,000 and approximately 140,000 Daltons.

In certain exemplary embodiments of the controlled release gel, the weight percentage of potassium permanganate in the mixture of polyvinyl acetate and potassium permanganate can vary from at least 7% (w/w) to approximately 70% (w/w), for instance about 7- about 10% (w/w), about 10%- about 50% (w/w), about 25- about 35% (w/w), about 25%- about 60% (w/w), about 40- about 60% (w/w), and/or about 50- about 70% (w/w), etc.

The degree to which potassium permanganate and polyvinyl acetate formed controlled release gels was determined using a scoring system, where a score of approximately 10 refers to a composition in which the entirety of the mass of polyvinyl acetate, potassium permanganate, and water was able to be isolated as a singular, discrete material approximately 3 days after the reaction began and a score of approximately 0 refers to a composition in which none of the mass of the original mixture of polyvinyl acetate, potassium permanganate, and water were able to be isolated as a singular, discrete material approximately 3 days after the reaction began. Masses were isolated by washing the reaction product with deionized water for a period of approximately 5 seconds, and then mechanically removing the largest portion by volume using forceps. Scores within that range reflect percentage levels between those two extremes (e.g., a score of approximately 9 means approximately 90% of the original material was able to be isolated as a singular, discrete material).

Figure 5:
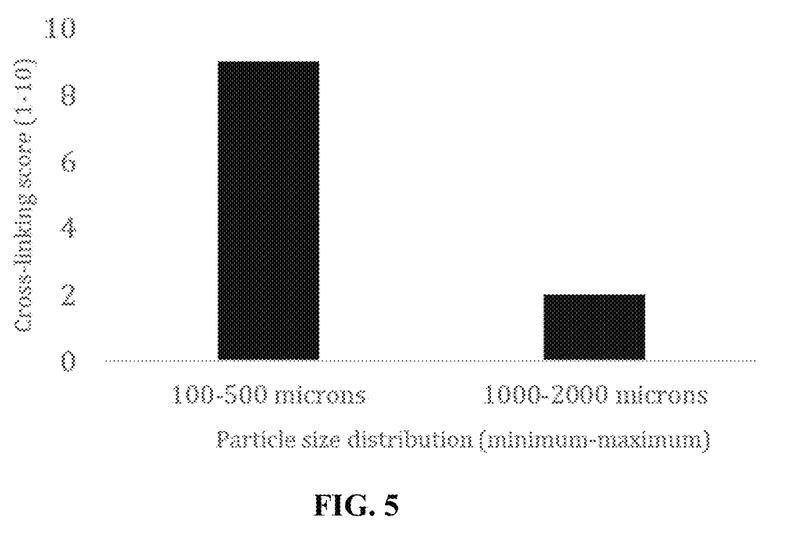
FIG. 5 is a graph of crosslinking as a function of an exemplary particle size distribution.
Figure 6:
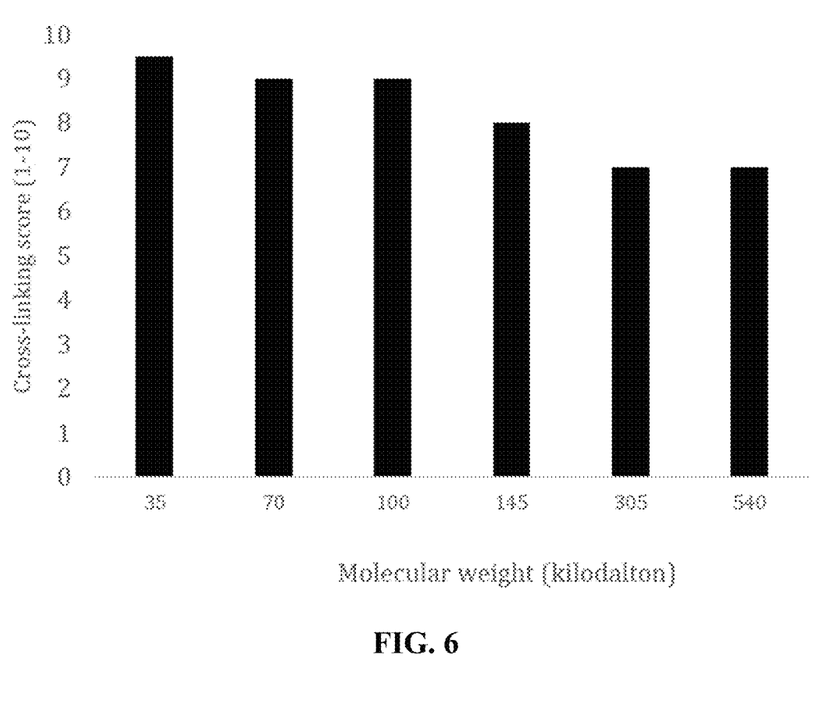
FIG. 6 is a graph of an exemplary molecular weights.

FIGS. 5 and 6 show the scores of certain exemplary embodiments as a function of particle size and molecular weight, respectively. Broadly, FIG. 5 shows cross-linking of materials made from controlled release gel mixtures comprising polyvinyl acetate at the specified particle size and potassium permanganate. More particularly, FIG. 5 demonstrates the extent of cross-linking in two exemplary embodiments of the permanganate-releasing gel materials, made from PVAc particles having size distributions between approximately 100 to approximately 500 microns or approximately 1000 to approximately 2000 microns. Cross-linking occurred with both samples, as evidenced by the ability to isolate the product of the reaction as a single, discrete material. The degree to which this cross-linking occurred over the approximately 3 day time period was substantially greater (an approximately 4.5-fold increase) for compositions arising from PVAc samples having a particle size ranging from approximately 100 to approximately 500 microns. In this manner, certain particle size distributions (e.g., approximately 100 to approximately 500 microns) might be preferred in instances where it is desirable to achieve a higher degree of cross-linking and extended release. In other instances, larger particle size distributions (e.g., approximately 1000 to approximately 2000 microns) might be preferred to reduce the total percentage of gel-like material formed from the reaction of PVAc and oxidant.

Broadly, FIG. 6 shows cross-linking of materials made from controlled release gel mixtures comprising polyvinyl acetate at the specified molecular weight and potassium permanganate. More particularly, FIG. 6 reports the impact of PVAc molecular weight on the degree of gel formation that occurred over an approximately 3 day reaction time. PVAc molecular weights ranging from approximately 35 kilodalton to approximately 540 kilodalton were evaluated, and small differences in cross-linking score were observed across the molecular weight range. PVAc with a molecular weight of approximately 35 kilodaltons led to a composition with a cross-linking score of approximately 9.5 (i.e., approximately 95% of the mass of the total mixture could be isolated as a single, discrete material) and PVAc with a molecular weight of approximately 540 kilodaltons led to a composition with a cross-linking score of approximately 7 (i.e., approximately 70% of the total mixture could be isolated as a single, discrete material). These results indicate that the gel-like materials can be produced from PVAc with a broad range of molecular weights, such as those having an average molecular weight of approximately 35 kilodaltons, approximately 70 kilodaltons, approximately 100 kilodaltons, approximately 145 kilodaltons, approximately 305 kilodaltons, and approximately 540 kilodaltons, etc.

Example 2: Synthesis of Controlled Release Gel from Potassium Permanganate, Sodium Persulfate, and Polyvinyl Acetate Additional oxidants can be added to the mixture, those oxidants including sodium persulfate, potassium persulfate, sodium percarbonate, and/or potassium percarbonate, etc. In one example, approximately 0.35 grams of potassium permanganate (manufactured by Carus LLC, Peru, IL) was mixed with approximately 0.35 grams of sodium persulfate (Klozur SP®, manufactured by Peroxychem; Philadelphia, PA) and approximately 0.3 grams of polyvinyl acetate (UWIFS PVAc from Wacker Chemie AG of Munich, Germany, milled to a particle size range of approximately 10 to approximately 500 microns). The mixture was inverted in a bag at least 10 times and to the mixture approximately 0.5 mL of deionized water was added and allowed to react for approximately 3 days. The resulting cross-linked material comprised both potassium permanganate and sodium persulfate.

Example 3: Controlled Release Gel Materials Provided in Tablet Form

Figure 7:
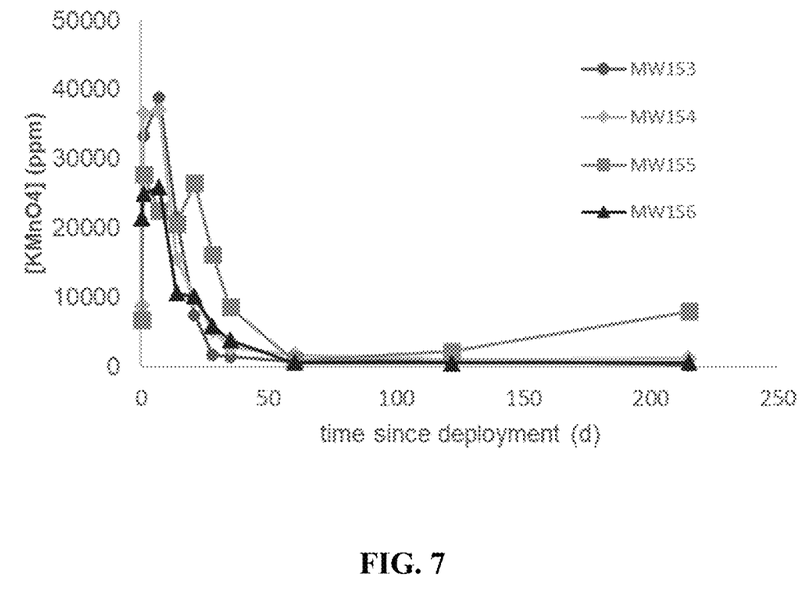
FIG. 7 is a graph of an exemplary oxidant concentration.

In some embodiments, the polymer and cross-linking agent can be provided in tablet form instead of powder form. In one example, approximately 70 weight % potassium permanganate (provided by Carus LLC, Peru, IL) was tablet pressed with approximately 30 weight % polyvinyl acetate (Wacker UWIFS, cryomilled to a size range of approximately 10 to approximately 500 microns) using a TDP-5 tablet press from LFA Machines, Fort Worth, TX. Tablets were deployed at a site contaminated with chlorinated solvent in Texas, USA. This site was an approximately 35'× approximately 40' area with perchloroethylene (PCE)-impacted soil and groundwater. Tablets (approximately 2.2 g each, approximately 70 weight % potassium permanganate) were loaded within an approximately 2 inch diameter screened canisters (approximately 0.1-approximately 0.2 inch screen size) in 4 different monitoring wells for a total of approximately 20 to approximately 23 pounds of tablet material per well. Groundwater samples were collected at each monitoring well and potassium permanganate was measured within the samples spectrophotometrically at approximately 525 nm using a Hach DR1900 portable spectrophotometer. The resulting material from the reaction of the tablets and groundwater was a viscous gel. Measurable concentrations of potassium permanganate exceeding the concentration required (>1 part per million) to degrade BTEX compounds, i.e., (the volatile, organic, aromatic hydrocarbon) compounds of benzene, toluene, ethylbenzene, and/or xylene, were found in these viscous gel samples over approximately 215 days (approximately 7.2 months) after tablet deployment (FIG. 7). This data indicates that tablets comprising polymer and an oxidizing cross-linking agent are capable of delivering oxidant to groundwater for long periods of time (i.e., at least over 215 days).

FIG. 7 shows permanganate ion concentrations in 4 monitoring wells (MW153, MW154, MW155, MW156) dosed with tablets comprising potassium permanganate and polyvinyl acetate.

Example 4: Injection of Polyvinyl Acetate and Potassium Permanganate into the Subsurface Via Hydraulic Fracturing to Form a Controlled Release Gel In one example, polyvinyl acetate and potassium permanganate were hydraulically injected into the subsurface to form a viscous controlled release gel in the subsurface, thus providing an injectable controlled release formulation. Two temporary injection wells (TW-1 and TW-2) were installed during the pilot study. The injection wells were advanced utilizing a direct-push technology (DPT) track-mounted drill rig (Geoprobe Model 7822DT, Salina, Kansas) operated by a North Carolina-licensed well driller. At each injection well location, approximately 5-foot (ft) sections of approximately 2-inch (in) steel DPT tooling equipped with an expendable tip were advanced to the targeted depth via the DPT drill rig. Temporary injection wells TW-1 and TW-2 were advanced to terminal depths of approximately 35 ft below grade and approximately 37.5 ft below grade, respectively. Once the injection activities were completed at each temporary injection well, the well was properly abandoned in accordance with North Carolina Well Construction and Abandonment Standards.

The composition utilized during the pilot study consisted of approximately 70% by weight potassium permanganate (Carus LLC, Peru, Illinois) and approximately 30% by weight PVAc polymer (UW1FS provided by Wacker Chemie of Munich, Germany). The mixture was prepared prior to injection by mixing approximately 100 pound batches of the potassium permanganate: Polyvinyl acetate mixture with approximately 50 gallons of municipal potable water. The water was obtained from a nearby water spigot and stored in an approximately 275-gallon polyethylene tote. The amount of water was minimized to mitigate over-dilution of the potassium permanganate and maintain a stable suspension of the powder mixture in the water. The approximately 50 gallons of water and approximately 100 pounds of powder mixture were slowly added to two approximately 70-gallon mixing vessels onboard a ChemGrout CG-502/031 skid-mounted grout plant (ChemGrout, Inc, La Grange Park, Illinois). The mixing vessels maintained the powder mixture in suspension until injection activities commenced.

Injection protocol: Temporary Injection wells TW-1 and TW-2 were advanced to terminal depths of approximately 35 feet below grade and approximately 37.5 feet below grade, respectively. Once at the terminal depth at both TW-1 and TW-2, the DPT tooling were retracted from the subsurface leaving the expendable tip in place and exposing the targeted aquifer interval for injection. Each temporary Injection well included five approximately 2-foot injection intervals, covering an approximately 10-foot overall injection zone. At each approximately 2-foot injection interval, approximately 100-pound batch of powdered mixture with approximately 50 gallon of municipal potable water were injected using an approximately 3-inch positive displacement air piston pump mounted at the base of the ChemGrout CG-502/031 skid-mounted grout plant. The powdered mixture was transferred to each injection well from the pump via an approximately 1-inch-high pressure rubber hose connected to the temporary well via a valved well-head assembly. Five batches of powdered mixture were mixed per injection point, totaling approximately 500 pounds of powdered mixture per temporary injection well.

Figure 8:
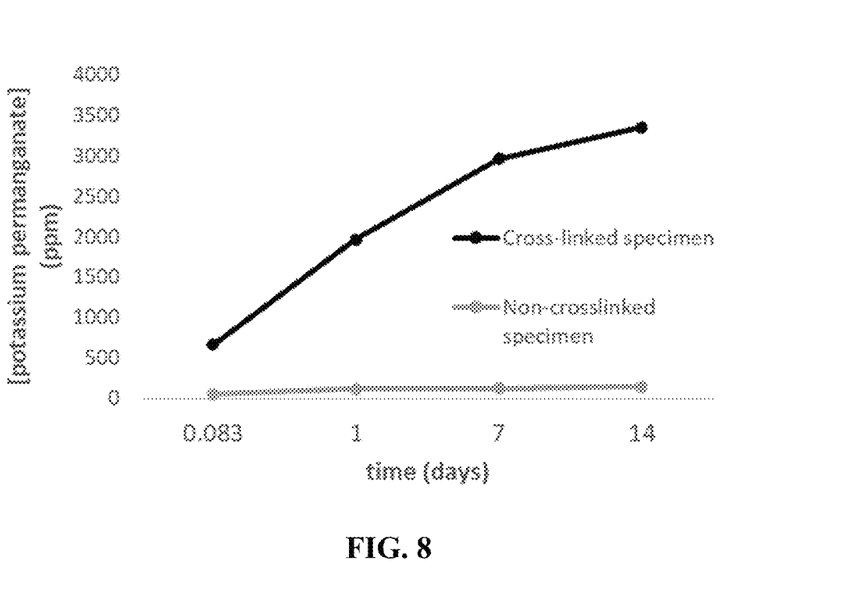
FIG. 8 is a graph of an in situ release of an exemplary oxidant.

Sampling protocol: Samples of injected material were collected by soil cores ranging from approximately 3 to approximately 8 lateral feet from the injection site. Samples of controlled release gel were collected ("cross-linked specimen"), as well as samples of soil that exhibited apparent permanganate sorption (i.e., soil purple in color) but no discernable gel ("non-cross-linked specimen"). Permanganate release from these samples was measured spectrophotometrically at approximately 525 nm using a Hach DR1900 portable spectrophotometer and is shown in FIG. 8.

Figure 9:
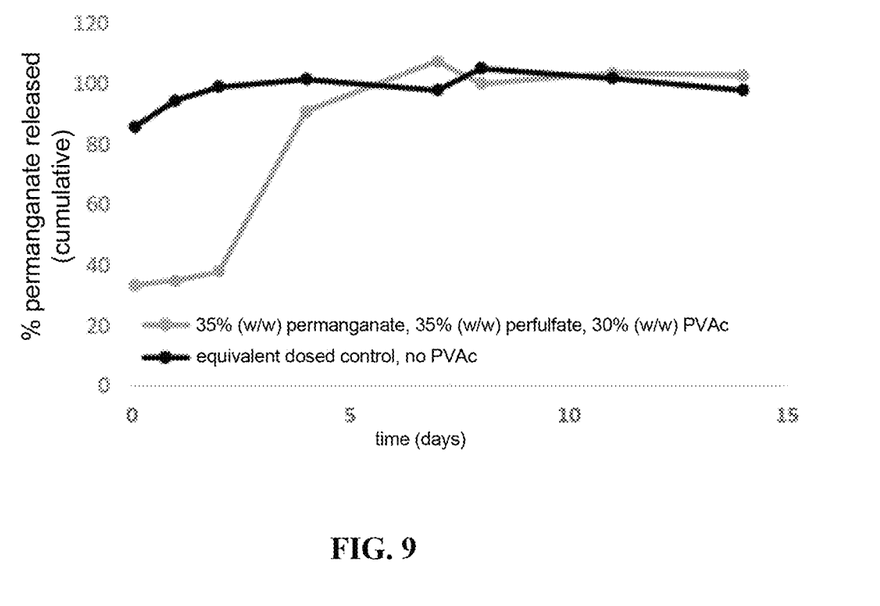
FIG. 9 is a graph of a release of an exemplary oxidant.

Example 5: Placement of a Powder Mixture of Polyvinyl Acetate, Potassium Permanganate, and Sodium Persulfate into a Well and Subsequent Controlled Release of Oxidant into Groundwater An exemplary method of deploying the controlled release oxidant is by deploying a sleeve material containing both a cross-linkable polymer and an oxidant capable of cross-linking that polymer. The sleeves can be deployed within wells that contain a water source, such that the water from the well source provides the necessary reactants needed to drive the cross-linking reaction. In one exemplary embodiment, an approximately 2.5 foot section of non-woven polypropylene fabric was prepared and filled with a mixture of approximately 0.875 pounds potassium permanganate (obtained from Carus LLC, Peru, IL), approximately 0.875 pounds sodium persulfate (Klozur SP®, obtained from Peroxychem of Philadelphia, PA), and approximately 0.75 pounds PVAc (UWIFS provided by Wacker of Munich, Germany). Before adding to the sleeve, the powder was mixed within an approximately 5 gallon container and inverted and agitated for at least 5 minutes to ensure adequate mixing of the individual powders. Once prepared, the powder-filled sleeve was tied off at the ends and added to an approximately 5 gallon bucket containing approximately 12 liters deionized water. Approximately 3 mL aliquots of water within the container were sampled at intervals of approximately 2 hours, 1, 2, 4, 7, 8, 11, and 14 days. Aliquots were measured for both permanganate and persulfate concentrations. Permanganate was measured spectrophotometrically at approximately 525 nm using a Hach DR1900 portable spectrophotometer. A control sample was prepared by preparing an equivalent sleeve with identical amounts of sodium persulfate and potassium permanganate where no PVAc was included. A release curve is provided in FIG. 9, which more particularly shows cumulative permanganate release over time from sleeves containing a well-mixed dispersion of potassium permanganate (approximately 35% w/w) sodium persulfate (approximately 35% w/w) and polyvinyl acetate (approximately 30% w/w) at a total weight of approximately 2.5 pounds. Sleeves were filled with the powder dispersion and then submerged in deionized water to induce cross-linking. Permanganate was measured spectrophotometrically at approximately 525 nm using a Hach DR1900 portable spectrophotometer. In the absence of PVAc, the total payload of potassium permanganate was released within 2 days. In the presence of PVAc, release of the total release duration of permanganate ion was extended to approximately 7 days. This data demonstrates an extended release duration of potassium permanganate when the mixture comprises both polyvinyl acetate and an additional oxidant such as sodium persulfate.

In one exemplary embodiment, the materials described herein were deployed into a well having a depth of approximately 13 feet, a diameter of approximately 2 inches, and an overall volume of approximately 8.03 liters. Approximately 10 pounds of total material was introduced into the well via 4 individual cannisters each containing approximately 2.5 pounds of approximately 35 weight % potassium permanganate, approximately 35 weight % sodium persulfate, and approximately 30 weight % polyvinyl acetate.

Cannisters were prepared by first mixing approximately 3 pounds polyvinyl acetate (UWIFS PVAc, obtained from Wacker of Munich Germany), approximately 3.5 pounds potassium permanganate (obtained from Carus LLC of Peru, IL) and approximately 3.5 pounds sodium persulfate (Klozur SP®, obtained from Peroxychem of Philadelphia Pa. The powders were mixed in a chemical fume hood and combined in an approximately 5 gallon container. The container was inverted and agitated for approximately 5 minutes to achieve homogenization of the powder.

Approximately 10 pounds of oxidant: polymer powder mixture was ultimately added to a non-woven polypropylene sleeve contained within a solid polypropylene cannister encasement. Four cannisters were lined end-to-end and secured with zip-ties to create the approximately 10 foot long cannister shell needed for the monitoring well. No water was added to the mixture as the water required for the cross-linking reaction was provided by the groundwater in the monitoring well.

Figure 10:
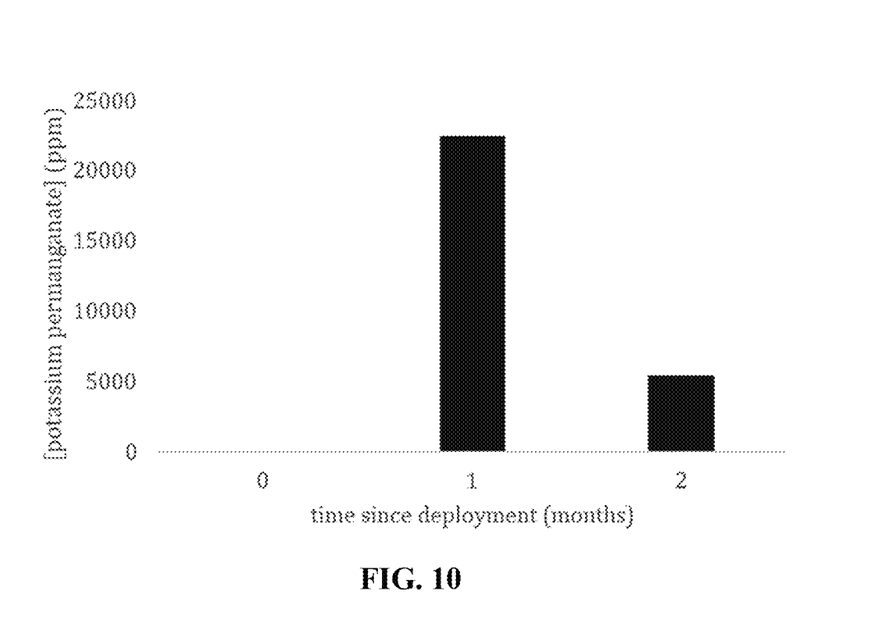
FIG. 10 is a graph of an exemplary oxidant concentration.

Permanganate concentrations in the water column within the monitoring well were measured at approximately 1 and 2 months from deployment and are shown in FIG. 10, which demonstrates that the cannisters provided a sustained release of permanganate into the surrounding groundwater for a period of at least 2 months. More particularly, FIG. 10 shows groundwater concentrations of potassium permanganate in a monitoring well loaded with sleeves containing approximately 10 pounds of a mixture containing approximately 35% (w/w) potassium permanganate, approximately 35% (w/w) sodium persulfate, and approximately 30% (w/w) polyvinyl acetate.

In certain exemplary embodiments, the cross-linking agent can be other than permanganate or other permanganate salts, e.g., boric acid, one or more borate salts, (e.g., sodium borate, sodium tetraborate, sodium tetraborate decahydrate), and/or one or more silicic acid salts (silicates) (e.g., sodium silicate, potassium silicate, etc.), etc. Organic contaminants that can be treated with the mixture include, e.g., perchloroethene, trichloroethylene, 1,1-dichloroethene, 1,2-dichloroethene, ethyl chloride, vinyl chloride, butane, xylene, ethylbenzene, and toluene, 1,4-dioxane, etc.

Figure 11:
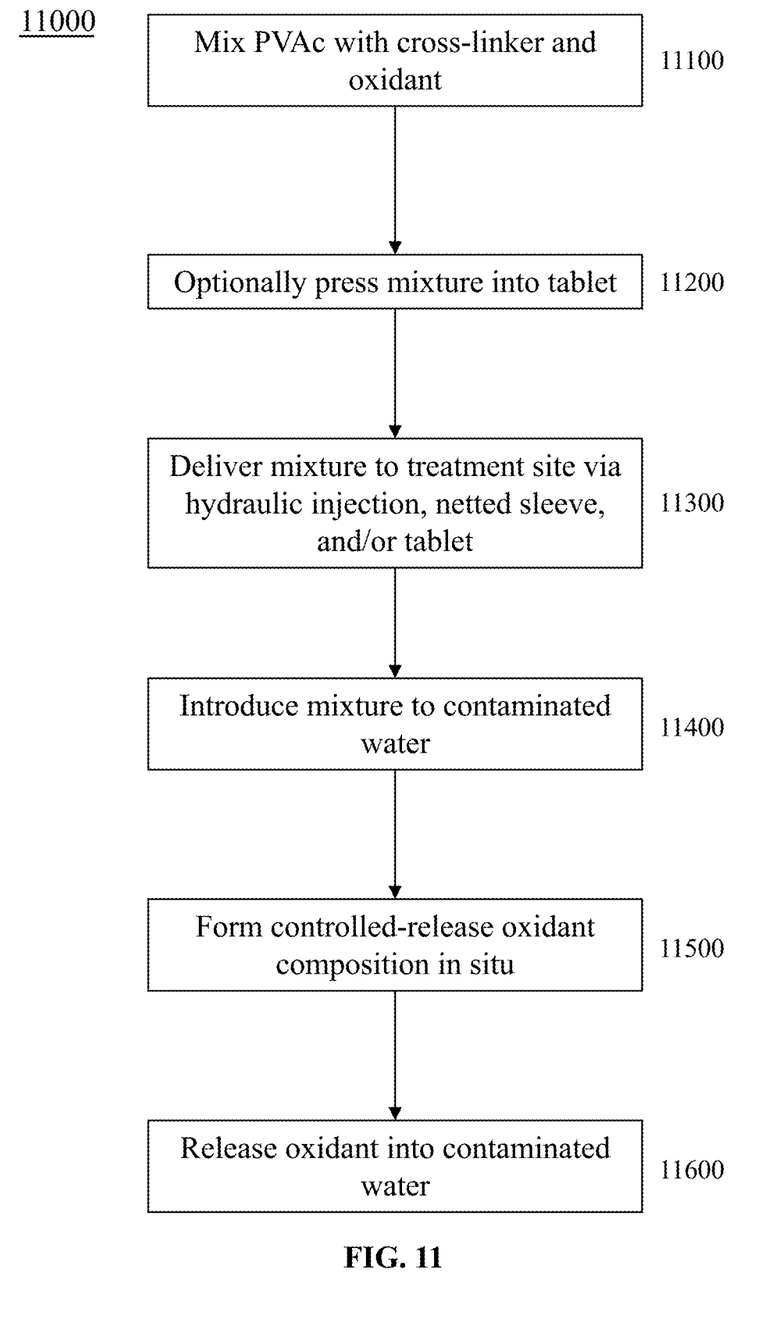
FIG. 11 is a flowchart of an exemplary embodiment of a method.

As illustrated in FIG. 11, certain exemplary embodiments can provide a method 11000 for treating contaminated groundwater in situ. At activity 11100, PVAc can be mixed with a cross-linking agent and an oxidant, which itself can be the cross-linking agent. At activity 11200, the mixture optionally can be pressed into tablet form. At activity 11300, the mixture can be delivered to a treatment zone, such as via injection, placement of a netted sleeve into a formed void space (e.g., bore hole or well), and/or placement of tablets into an open excavation or formed void space. At activity 11400, the mixture can be introduced to contaminated groundwater. At activity 11500, combination of the mixture and the contaminated groundwater can form, in situ, a controlled-release composition. At activity 11600, the composition can release oxidant into the contaminated water, thereby oxidizing the contaminant.

Example 6: Degradation of perchloroethylene by permanganate-releasing cross-linked PVAc Nine samples of permanganate-releasing cross-linked PVAc were created by adding approximately 0.7 g potassium permanganate (Carus LLC, free flowing grade) and approximately 0.3 g of UWIFS (Wacker) to a small WhirlPak bag. The solids were mixed by inverting ten times, then approximately 0.5 mL of deionized water was added to the solids. The mixtures were sealed and protected from light for approximately 3 days.

After approximately 3 days, the resulting gel-like reaction products were removed from the WhirlPak bags and placed in the bottom of 9 Thermo Scientific™ Wide-Mouth Septa Jars (approximately 250 mL). A total of approximately 360 g pre-washed, #8-mesh sieved, dry sand was used for each jar. A small amount of sand was placed on top of the cross-linked reaction products in the wide-mouth septa jars. The remaining sand was combined with approximately 130 mL of groundwater known to be contaminated with perchloroethylene. The jars were wet packed with this contaminated groundwater-sand slurry. The jars were filled such that there was essentially no headspace between the sand and the lid, minimizing loss of perchloroethylene to volatilization. Control samples were prepared with equivalent amounts of sand and contaminated groundwater, but without permanganate or PVAc.

Figure 12:
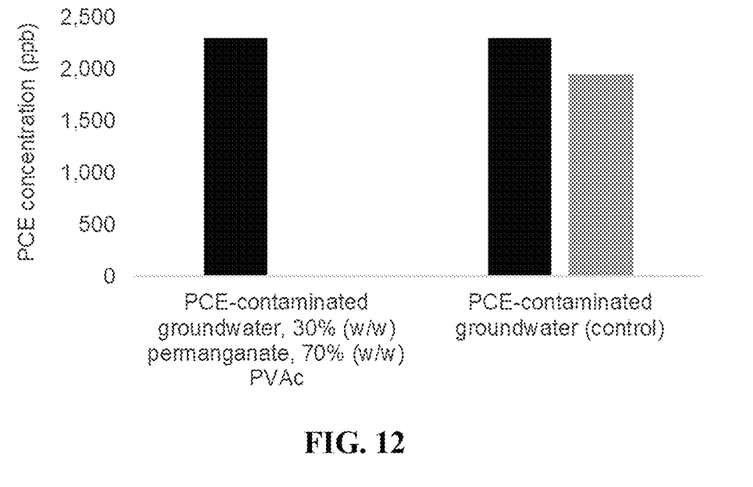
FIG. 12 is a graph of perchloroethylene degradation by an exemplary oxidant.

At approximately 0 and approximately 552 hours following preparation of the jars, approximately 40 mL samples were extracted from the bottom of each jar using a approximately 50 mL Fortuna Glass Syringe and placed in a approximately 40 mL vial with essentially no headspace. Samples were sent to a contract analytical laboratory (Con-Test, East Longmeadow, MA) in duplicate for VOC analysis. Samples were stored on ice and analyzed via EPA 8260 method by Gas Chromatography-Mass Spectrometry. FIG. 12. shows degradation of perchloroethylene (PCE) to non-detectable levels following incubation with the permanganate-releasing cross-linked PVAc product. In contrast, control samples showed minimal loss of perchloroethylene over the same period. The loss observed for controls is most likely due to sample loss through volatilization.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For interpreting a claim of any patent that claims priority hereto, each definition in that patent functions as a clear and unambiguous disavowal of the subject matter outside of that definition.

a—at least one.
about-around and/or approximately.
above—at a higher level.
acid—a compound capable of neutralizing alkalis and reddening blue litmus paper, containing hydrogen that can be replaced by a metal or an electropositive group to form a salt, or containing an atom that can accept a pair of electrons from a base. Acids are proton donors that yield hydronium ions in water solution, or electron-pair acceptors that combine with electron-pair donors or bases.
across—from one side to another.
activity—an action, act, step, and/or process or portion thereof.
adapt—to design, make, set up, arrange, shape, configure, and/or make suitable and/or fit for a specific purpose, function, use, and/or situation.
add—to combine, join, unite, include, and/or increase in quality, quantity, size, and/or scope.
after—following in time and/or subsequent to.
agent—a force and/or substance that causes a change; a means by which something is done and/or caused; and/or an instrument.
air—the earth's atmospheric gas.
along-through, on, beside, over, in line with, and/or parallel to the length and/or direction of; and/or from one end to the other of.
and—in conjunction with.
and/or—either in conjunction with or in alternative to.
any—one, some, every, and/or all without specification.
apparatus—an appliance or device for a particular purpose.
approximately—about and/or nearly the same as.
around—about, surrounding, and/or on substantially all sides of; and/or approximately.
as long as—if and/or since.
associate—to join, connect together, and/or relate.
at—in, on, and/or near.
at least—not less than, and possibly more than.
at least one—not less than one, and possibly more than one.
between—in a separating interval and/or intermediate to.
by—via and/or with the use and/or help of.
can—is capable of, in at least some embodiments.
cause—to bring about, provoke, precipitate, produce, elicit, be the reason for, result in, and/or effect.
chelate—a chemical compound in the form of a heterocyclic ring, containing a metal ion attached by coordinate bonds to at least two nonmetal ions.
chelating agent (a.k.a. "chelate")—a heterocyclic compound having a central metallic ion attached by covalent bonds to two or more nonmetallic atoms in the same molecule.
composition of matter—a combination, reaction product, compound, mixture, formulation, material, and/or composite formed by a human and/or automation from two or more substances and/or elements.
compound—a pure, macroscopically homogeneous substance consisting of atoms or ions of two or more different elements in definite proportions that cannot be separated by physical methods. A compound usually has properties unlike those of its constituent elements.
comprising—including but not limited to.
conceive—to imagine, conceptualize, form, and/or develop in the mind.
concentration—a measure of how much of a given substance is mixed, dissolved, contained, and/or otherwise present in and/or with another substance, and/or a measure of the amount of dissolved substance contained per unit of volume and/or the amount of a specified substance in a unit amount of another substance, both measures defining a structure of a composition that comprises both substances.
configure—to design, arrange, set up, shape, and/or make suitable and/or fit for a specific purpose, function, use, and/or situation.
contact—(v) to touch, come together, and/or be in immediate proximity of; (n) a state and/or condition of touching, coming together, and/or being in immediate proximity.
contaminate—(v) to make impure and/or unsuitable, esp by contacting, touching, and/or mixing with something unclean, bad, and/or toxic; to pollute, to taint.
contain—to include but not be limited to; to have as contents and/or part of the contents; to contain as a secondary and/or minor ingredient and/or element; to be made up of and/or contain; to comprise; to add as part of something else; and/or to put in as part of a set, group, and/or category.
contaminant—a substance that contaminates.
contaminated—including a contaminant
controlled-release—released, discharged, activated, freed, caused and/or allowed to move away from, and/or made available for use at predetermined intervals and/or gradually over a period of time.
convert—to transform, adapt, and/or change.
corresponding-related, associated, accompanying, similar in purpose and/or position, conforming in every respect, and/or equivalent and/or agreeing in amount, quantity, magnitude, quality, and/or degree.
create—to bring into being.
cross-link-(n) a chemical bond, atom, or group of atoms that connects two adjacent chains of atoms in a large and/or complex organic molecule such as a polymer and/or protein; (v) to attach via a cross-link.
cycle—a set of predetermined activities.

define—to establish the meaning, relationship, outline, form, and/or structure of; and/or to precisely and/or distinctly describe and/or specify.

degradation product—a chemical product resulting from the breakdown of an environmental contaminant by means of oxidation, reduction, decomposition, or other chemical reaction deliver—to give forth and/or produce; to carry, bring, and/or transport to one or more destinations and/or recipients; to distribute; to transfer possession of; and/or to set free.

derive—to receive, obtain, and/or produce from a source and/or origin.

determine—to find out, obtain, calculate, decide, deduce, ascertain, and/or come to a decision, typically by investigation, reasoning, and/or calculation.

device—a machine, manufacture, and/or collection thereof.

distribution—a set of data, events, occurrences, outcomes, objects, and/or entities and their frequency of occurrence collected from measurements over a statistical population.

each—every one of a group considered individually.

effective—sufficient to bring about, provoke, elicit, and/or cause.

elemental—of, relating to, or denoting a chemical element.

embodiment—an implementation, manifestation, and/or concrete representation.

estimate—(n) a calculated value approximating an actual value; (v) to calculate and/or determine approximately and/or tentatively.

exemplary—serving as an example, instance, and/or illustration.

first—an initial element in a set.

for—over a span of (time and/or distance); at a specified time; intended to reach; directed and/or belonging to; to the advantage of; in the direction of; in favor of; in support of; in order to get and/or achieve; appropriate to; designed to meet the needs of; meant to be used in; in exchange for; at a cost of; to the amount of; such as explains and/or results in; in place of; because of; through; with regard and/or consideration to the usual characteristics of; concerning; as regards; as being; to do and/or partake of; in the duty and/or task of; to allow of; despite; notwithstanding; to preserve, retain, etc; as a direct equivalent to; and/or to become and/or enter.

form—(v) to produce, construct, build, generate, compose, establish, define, generate, shape, and/or create; (n) a phase, structure, and/or appearance.

from—used to indicate a source, origin, and/or location thereof.

further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container; and/or a substance in a gaseous state.

gelatinous—having the nature of and/or resembling jelly, esp. in consistency; jellylike.

generate—to create, produce, give rise to, and/or bring into existence.

given—predetermined and/or existing.

groundwater—underground water that mainly comes from the seepage of surface water, typically supplies wells and springs, and/or is often found between saturated soil and rock.

having-including but not limited to.

hydraulic—of, involving, moved by, and/or operated by a fluid, especially water, under pressure; operated by pressure transmitted through a pipe by a liquid; of, concerned with, and/or employing liquids in motion.

in situ—in the natural, original, and/or appropriate position and/or place.

including—including but not limited to.

initialize—to prepare something for use and/or some future event.

inject—to force and/or drive a fluid into something, such as a passage, cavity, and/or tissue.

injection—the act of injecting.

install—to connect or set in position and prepare for use.

into—to a condition, state, and/or form of; toward; in the direction of; and/or to the inside of.

introduce—to bring in and establish in a new place and/or environment; to put inside and/or into; to insert or inject; and/or to put or place into something, such as for the first time.

ion—an electrically charged atom or group of atoms formed by the loss or gain of one or more electrons, as a cation (positive ion), which is created by electron loss and is attracted to the cathode in electrolysis, or as an anion (negative ion), which is created by an electron gain and is attracted to the anode. The valence of an ion is equal to the number of electrons lost or gained and is indicated by a plus sign for cations and a minus sign for anions, thus: Na+, Cl−, Ca++, S=.

is—to exist in actuality.

kilodalton—a unit of mass equal to 1,000 atomic mass units.

ligand—an ion, a molecule, or a molecular group that binds to another chemical entity to form a larger complex.

lower—(v) to let, bring, or move down, such as to a level that is below; to reduce in value, degree, and/or quality; to weaken; to undermine; to reduce in standing and/or respect; to become less; to diminish; (adj) smaller in magnitude.

manmade—a tangible physical item that is synthetic and/or made by humans rather than occurring in nature.

mass-to-mass ratio—the mass of a first substance expressed with respect to the mass of a second substance.

may—is allowed and/or permitted to, in at least some embodiments.

medium—any substance or material, such as one or more solids, liquids, vapors, fluids, water, and/or air, etc.

meter—a device adapted to detect and/or record a measured value.

method—one or more acts that are performed upon subject matter to be transformed to a different state or thing and/or are tied to a particular apparatus, said one or more acts not a fundamental principal and not preempting all uses of a fundamental principal.

micron—one thousandth of a millimeter.

milligram—One one-thousandth of a gram.

mix—to combine and/or blend into one mass, stream, and/or mixture; and/or to create and/or form by combining ingredients.

mixture—a composition of two or more substances that are not chemically combined with each other and are capable of being separated.

molecular weight—the sum of the atomic weights of all the atoms in a molecule; aka, a relative molecular mass.

molecule—the smallest particle of a substance that retains the chemical and physical properties of the substance and is composed of two or more atoms; and/or a group of like or different atoms held together by chemical forces.

more—a quantifier meaning greater in size, amount, extent, and/or degree; in addition to.

near—a distance of less than approximately 100 feet net—a web, and/or an openwork fabric, typically made of threads and/or cords that are woven and/or knotted together at regular intervals, and/or something made of such an openwork fabric.

netted-having open interstices and/or having the characteristics of a net and/or web.

no—an absence of and/or lacking any.

one—being and/or amounting to a single unit, individual, and/or entire thing, item, and/or object.

operable-practicable and/or fit, ready, and/or configured to be put into its intended use and/or service.

or—a conjunction used to indicate alternatives, typically appearing only before the last item in a group of alternative items.

organic—a compound containing carbon, which is further characterized by the presence in the molecule of two carbon atoms bonded together; or one atom of carbon bonded to at least one atom of hydrogen or halogen; or one atom of carbon bonded to at least one atom of nitrogen by a single or double bond.

outside-beyond a range, boundary, and/or limit; and/or not within.

oxidation—a chemical reaction in which an atom or ion loses electrons, thus undergoing an increase in valence, e.g., removing an electron from an iron atom having a valence of +2 changes the valence to +3.

oxidation-reduction—a reversible chemical process usually involving the transfer of electrons, in which one reaction is an oxidation and the reverse reaction is a reduction.

oxidation—reduction potential—in aqueous solutions, a measure of the tendency of the solution to either gain or lose electrons when it is subject to change by introduction of a new species.

oxidize—to undergo and/or cause to undergo a chemical reaction and/or combination with oxygen; to convert (an element) into an oxide; to form and/or cause to form a layer of metal oxide, as in rusting; to add oxygen and/or any nonmetal; to lose and/or cause to lose hydrogen atoms; and/or to undergo and/or cause to undergo a decrease in the number of electrons, thereby increasing the valence.

oxidizing agent ("oxidant" and/or "oxidizer")—a substance, such as a hydrogen peroxide, calcium peroxide, magnesium peroxide, ozone, persulfate, chlorite, hypochlorite, chlorine, bromine, permanganate, peracetic acid, and/or chlorine dioxide, that oxidizes another substance, usually by accepting electrons; and/or an agent that extracts electrons from a chemical moiety and increases its positive or decreases its negative valence-often an oxygen and/or halogen containing material.

pack—to press together; to compact firmly; to put into a receptacle for transporting and/or storing; to fill up tight; and/to cram.

particle—a small piece and/or part that can be and/or be comprised by a powder, bead, crumb, crystal, dust, grain, grit, meal, pounce, pulverulence, and/or seed, etc.

per—for each and/or by means of.

percentage—a fraction and/or ratio with 100 understood as the denominator; a proportion or share in relation to a whole.

period—a time interval.

permanganate—a salt of permanganic acid.

pH—a measure representing the base 10 logarithm of the reciprocal of hydrogen ion concentration in gram atoms per liter, used to express the acidity or alkalinity of a solution on a scale of 0 to 14, where less than 7 represents acidity, 7 neutrality, and more than 7 alkalinity.

plurality—the state of being plural and/or more than one.

portion—a part, component, section, percentage, ratio, and/or quantity that is less than a larger whole.

ppm—parts per million.

pre- —a prefix that precedes an activity that has occurred beforehand and/or in advance.

predetermine—to determine, decide, and/or establish in advance.

press—to squeeze and/or compress so as to alter in shape and/or form; and/or to reshape and/or make compact by applying steady force.

prevent—to hinder, avert, and/or keep from occurring.

prior—before and/or preceding in time or order.

probability—a quantitative representation of a likelihood of an occurrence.

product—something produced by human and/or mechanical effort.

project—to calculate, estimate, or predict.

provide—to furnish, supply, give, and/or make available.

pure—having a substantially homogeneous and/or uniform composition, not mixed, and/or substantially free of foreign substances.

range—a measure of an extent of a set of values and/or an amount and/or extent of variation.

ratio—a relationship between two quantities expressed as a quotient of one divided by the other.

re-activate—to make active again and/or to restore the ability to function and/or the effectiveness of.

react—to cause (a substance or substances) to undergo a reaction.

reactants—substances that react in a chemical reaction.

reaction—a change and/or transformation in which a substance decomposes, combines with other substances, and/or interchanges constituents with other substances.

reaction product-something produced by a chemical reaction.

receive—to get as a signal, take, acquire, and/or obtain.

recommend—to suggest, praise, commend, and/or endorse.

reduce—to make and/or become lesser and/or smaller.

release—to let go and/or free from something that restrains, binds, fastens, and/or holds back.

remove—to eliminate, remove, and/or delete, and/or to move from a place or position occupied.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

said—when used in a system or device claim, an article indicating a subsequent claim term that has been previously introduced.

salt—a chemical compound formed by replacing all or part of the hydrogen ions of an acid with metal ions and/or electropositive radicals.

saturated—full and/or unable to hold and/or contain more.

select—to make a choice or selection from alternatives.

set—a related plurality.

size—(n) physical dimensions, proportions, magnitude, amount, and/or extent of an entity; (v) to determine physical dimensions, proportions, magnitude, amount, and/or extent of an entity.

sleeve—an annular member and/or part; a liner; a case into which an object or device fits; a tube fitted externally over two cylindrical parts in order to join them; bush; and/or a tubular piece that is forced and/or shrunk into a cylindrical bore to reduce the diameter of the bore and/or to line it with a different material.

species—a class of individuals and/or objects grouped by virtue of their common attributes and assigned a common name; a division subordinate to a genus.

spent—used up, consumed, exhausted, and/or depleted of effectiveness.

state—a qualitative and/or quantitative description of condition.

store—to place, hold, and/or retain data, typically in a memory.

stream—a steady current of a fluid.

substantially—to a great extent and/or degree.

system—a collection of mechanisms, devices, machines, articles of manufacture, processes, data, and/or instructions, the collection designed to perform one or more specific functions.

tablet—a small, flat, or flattish cake or piece of some solid or solidified substance that—used as the subject or object of a relative clause.

those—the aforementioned; used to indicate one of two or more persons and/or things already mentioned.

through—across, among, between, and/or in one side and out the opposite and/or another side of.

to—a preposition adapted for use for expressing purpose.

transform—to change in measurable: form, appearance, nature, and/or character.

transmit—to send as a signal, provide, furnish, and/or supply.

treat—to subject to a process, treatment, action, and/or change.

treatment—an act, manner, or method of handling and/or dealing with someone and/or something.

upon—immediately or very soon after; and/or on the occasion of.

use—to put into service.

via—by way of and/or utilizing.

w/w—weight to weight weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

well—a hole and/or shaft that is excavated, drilled, bored, sunk, and/or cut into the earth so as to access and/or tap a supply, source, stream, pool, reservoir, and/or quantity of water, oil, gas, brine, etc.

when—at a time and/or during the time at which.

wherein—in regard to which; and; and/or in addition to.

with—accompanied by.

with regard to—about, regarding, relative to, and/or in relation to.

with respect to—about, regarding, relative to, and/or in relation to.

within—inside the limits of.

zone—a region and/or volume having at least one predetermined boundary.

Notes

Various substantially and specifically practical and useful exemplary embodiments are described herein, textually and/or graphically, including the best mode, if any, known to the inventor(s), for implementing the described subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the described subject matter to be practiced other than as specifically described herein. Accordingly, as permitted by law, the described subject matter includes and covers all variations, details, and equivalents of that described subject matter. Moreover, as permitted by law, every combination of the herein described characteristics, functions, activities, substances, and/or structural elements, and all possible variations, details, and equivalents thereof, is encompassed by the described subject matter unless otherwise clearly indicated herein, clearly and specifically disclaimed, or otherwise clearly inoperable or contradicted by context.

The use of any and all examples, or exemplary language (e.g., "such as") provided herein, is intended merely to better illuminate one or more embodiments and does not pose a limitation on the scope of any described subject matter unless otherwise stated. No language herein should be construed as indicating any described subject matter as essential to the practice of the described subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:
any two or more described substances can be mixed, combined, reacted, separated, and/or segregated;
any described characteristics, functions, activities, substances, and/or structural elements can be combined, integrated, segregated, and/or duplicated;
any described activity can be performed manually, semi-automatically, and/or automatically;
any described activity can be repeated, any activity can be combined with any other described activity, performed by multiple entities, and/or performed in multiple jurisdictions; and
any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of any claims presented herein or in any document claiming priority hereto) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into and clearly implied as being presented within the specification as if it were individually recited herein. For example, if a range of 1 to 10 is described, even implicitly, unless otherwise stated, that range necessarily includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc., even if those specific values or specific sub-ranges are not explicitly stated.

When any phrase (i.e., one or more words) described herein or appearing in a claim of an application claiming priority hereto is followed by a drawing element number, that drawing element number is exemplary and non-limiting on the description and claim scope.

No claim of this document or any document claiming priority hereto is intended to invoke 35 USC 112 (f) unless the precise phrase "means for" is followed by a gerund.

Any information in any material (e.g., a patent document such as a United States patent or United States patent application, or a non-patent reference, such as a book, article, web page, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within This document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, and any provided definitions of the phrases used herein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A method of treating contaminated groundwater in situ, the method comprising the activities of:
   mixing polyvinyl acetate with a permanganate salt to form a mixture; introducing the mixture into the contaminated groundwater to form a cross-linked polyvinyl acetate network in the mixture;
   forming in situ, from the mixture and the contaminated groundwater, a controlled-release oxidant composition; and
   wherein the permanganate salt and the polyvinyl acetate are selected in amounts so that the controlled-release oxidant composition releases
   the permanganate salt into the contaminated groundwater for a period of at least 6 months.

2. The method of claim 1, comprising adding one or more oxidants to the mixture, wherein the additional oxidant is a salt of percarbonate or persulfate.

3. The method of claim 1, wherein the introducing activity comprises delivering the mixture via hydraulic injection.

4. The method of claim 1, wherein the mixing and introducing activities comprise packing the polyvinyl acetate and the permanganate salt within a netted sleeve, and lowering the netted sleeve into a void space that is in contact with the contaminated groundwater.

5. The method of claim 1, wherein the mixture is pressed into at least one tablet prior to the introducing activity.

6. The method of claim 1, wherein the permanganate salt is potassium permanganate.

7. The method of claim 1, wherein the polyvinyl acetate has a particle size distribution of about 5 microns to about 2000 microns.

8. The method of claim 1, wherein the polyvinyl acetate has a particle size distribution of about 100 microns to approximately 500 microns.

9. The method of claim 1, wherein the polyvinyl acetate has a molecular weight of approximately 35 kilodalton to approximately 540 kilodalton.

10. The method of claim 1, wherein a weight percentage of the permanganate salt in the mixture is 7% (w/w) to approximately 70% (w/w).

11. The method of claim 1, wherein the contaminated groundwater includes one or more contaminants selected from: perchloroethene; trichloroethylene; 1,1-dichloroethene; 1,2-dichloroethene; ethyl chloride; vinyl chloride; butane, xylene; ethylbenzene; toluene; and 1,4-dioxane; and degradation products of those contaminants.

12. A method for in situ treatment of contaminated groundwater, the method comprising the activities of:
- mixing polyvinyl acetate with a cross-linking agent and an oxidant to form a mixture;
- introducing the mixture into the contaminated groundwater to form a cross-linked polyvinyl acetate network in the mixture;
- forming in situ, from the mixture and the contaminated groundwater, a controlled-release oxidant composition; and
- releasing the oxidant from the controlled-release oxidant composition into the contaminated groundwater for a period of at least 6 months.

13. The method of claim 12, wherein the cross-linking agent is a permanganate salt.

14. The method of claim 12, wherein the oxidant is a permanganate salt.

15. The method of claim 12, wherein the oxidant is a persulfate salt.

16. The method of claim 12, wherein the oxidant is sodium persulfate, potassium persulfate, sodium percarbonate, and/or potassium percarbonate.

* * * * *